(12) United States Patent
Joanny

(10) Patent No.: US 9,152,293 B2
(45) Date of Patent: Oct. 6, 2015

(54) SERVER IP ADDRESSING IN A COMPUTING-ON-DEMAND SYSTEM

(75) Inventor: Patrick M. Joanny, Silver Spring, MD (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 558 days.

(21) Appl. No.: 12/964,040

(22) Filed: Dec. 9, 2010

(65) Prior Publication Data

US 2012/0151353 A1    Jun. 14, 2012

(51) Int. Cl.
*G06F 3/0481* (2013.01)
*H04L 29/08* (2006.01)

(52) U.S. Cl.
CPC .......... *G06F 3/0481* (2013.01); *H04L 29/0899* (2013.01)

(58) Field of Classification Search
CPC .................................................. H04L 29/0899
USPC .......................................................... 715/735
See application file for complete search history.

(56) References Cited

U.S. PATENT DOCUMENTS

| | | | | |
|---|---|---|---|---|
| 6,061,349 | A * | 5/2000 | Coile et al. ..................... | 370/389 |
| 6,195,689 | B1 * | 2/2001 | Bahlmann ..................... | 709/217 |
| 7,469,295 | B1 * | 12/2008 | Gangadharan ................ | 709/232 |
| 7,577,722 | B1 * | 8/2009 | Khandekar et al. ........... | 709/220 |
| 7,703,018 | B2 * | 4/2010 | Chaudhry et al. ............. | 715/735 |
| 7,830,896 | B2 * | 11/2010 | Srivastava ..................... | 370/401 |
| 8,046,694 | B1 * | 10/2011 | Lappas et al. ................. | 715/740 |
| 2002/0152322 | A1 * | 10/2002 | Hay ............................... | 709/245 |
| 2004/0221061 | A1 * | 11/2004 | Chavez ......................... | 709/245 |
| 2004/0236861 | A1 * | 11/2004 | Bondar et al. ................ | 709/230 |
| 2005/0081157 | A1 * | 4/2005 | Clark et al. ................... | 715/736 |
| 2005/0091307 | A1 * | 4/2005 | Venkatsubra et al. ........ | 709/203 |
| 2005/0091310 | A1 * | 4/2005 | Salomon ....................... | 709/203 |
| 2005/0177635 | A1 * | 8/2005 | Schmidt et al. ............... | 709/226 |
| 2005/0228856 | A1 * | 10/2005 | Swildens et al. .............. | 709/200 |
| 2006/0011720 | A1 * | 1/2006 | Call ............................... | 235/383 |
| 2006/0047813 | A1 * | 3/2006 | Aggarwal et al. ............. | 709/226 |
| 2006/0221821 | A1 * | 10/2006 | Martinez Ransom et al. .............................. | 370/229 |
| 2007/0058606 | A1 * | 3/2007 | Koskelainen ................. | 370/351 |
| 2007/0100979 | A1 * | 5/2007 | Soland et al. ................. | 709/223 |
| 2007/0143454 | A1 * | 6/2007 | Ma et al. ....................... | 709/222 |
| 2008/0183570 | A1 * | 7/2008 | Brandt et al. .................. | 705/14 |
| 2008/0313229 | A1 * | 12/2008 | Taswell ...................... | 707/104.1 |
| 2009/0319647 | A1 * | 12/2009 | White et al. .................. | 709/221 |
| 2010/0005175 | A1 * | 1/2010 | Swildens et al. .............. | 709/226 |
| 2010/0122175 | A1 * | 5/2010 | Gupta et al. .................. | 715/735 |
| 2010/0293269 | A1 * | 11/2010 | Wilson et al. ................. | 709/224 |
| 2010/0293544 | A1 * | 11/2010 | Wilson et al. ..................... | 718/1 |
| 2010/0332989 | A1 * | 12/2010 | Havivi .......................... | 715/733 |
| 2011/0055707 | A1 * | 3/2011 | Kimmet ........................ | 715/735 |
| 2011/0209145 | A1 * | 8/2011 | Chen et al. ........................ | 718/1 |
| 2011/0238658 | A1 * | 9/2011 | Schimmelpfeng ............ | 707/723 |
| 2012/0102163 | A1 * | 4/2012 | Witt et al. ..................... | 709/221 |
| 2012/0117571 | A1 * | 5/2012 | Davis et al. ................... | 718/105 |

(Continued)

*Primary Examiner* — Reza Nabi

(57) ABSTRACT

A method and system may provide a graphical user interface to a user via a web portal. A representation of a provisioned server device may be provided via the graphical user interface, wherein a primary Internet protocol (IP) address is associated with the provisioned server device. A selection of the provisioned server device may be received. A request to assign a secondary IP address to the selected server device may be received, wherein the secondary IP address is different from the primary IP address. The secondary IP address to the selected server device may be assigned based on the request.

16 Claims, 13 Drawing Sheets

(56) References Cited

U.S. PATENT DOCUMENTS

| | | | |
|---|---|---|---|
| 2012/0151358 A1* | 6/2012 | Joanny et al. | 715/736 |
| 2012/0166589 A1* | 6/2012 | Swildens et al. | 709/217 |
| 2012/0265863 A1* | 10/2012 | Von Eicken et al. | 709/220 |
| 2013/0031356 A1* | 1/2013 | Prince et al. | 713/151 |
| 2013/0031562 A1* | 1/2013 | Gusak | 718/105 |

* cited by examiner

SERVER IP ADDRESSING IN A COMPUTING-ON-DEMAND SYSTEM

BACKGROUND INFORMATION

An in-house system developer may sometimes purchase and stage devices to build a system. When purchasing the devices, the system developer may evaluate device specifications, price, and/or equipment compatibility in light of particular project requirements. When staging the devices, the system developer may install operating systems, applications, databases and web servers, may apply patches, and/or may configure the devices.

DETAILED DESCRIPTION OF PREFERRED EMBODIMENTS

The following detailed description refers to the accompanying drawings. The same reference numbers in different drawings may identify the same or similar elements.

As described below, a system may enable a user to assign multiple Internet protocol (IP) addresses to a server device in a computing as a service environment. When a user wishes to obtain computing or modify computing resources (e.g., virtual or physical server devices, etc.), the user may connect to an integrated provisioning system via a web portal. Once connected via a web interface, the user may configure a provisioned server to include multiple IP addresses. This may allow a single server device to provide or support a number of network services (e.g., web servers, etc.). Assignment of the multiple IP addresses includes obtaining IP addresses from an IP address management device and updating one or more databases to reflect the assignment of the IP addresses to particular server devices. Once the multiple IP addresses have been assigned, server pools or load balancing resource pools may be configured based on the IP addresses.

Figure 1:
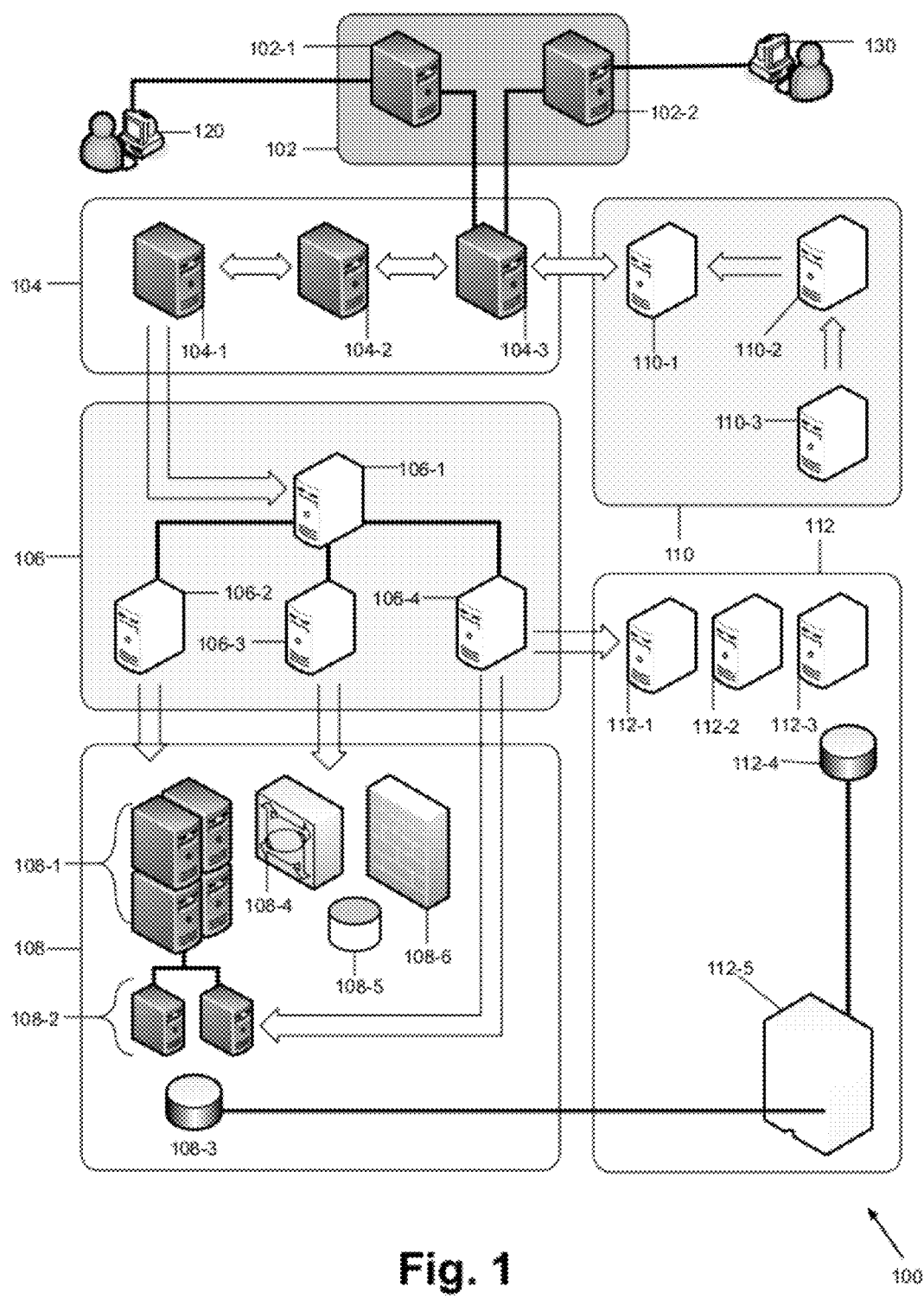
FIG. 1 is a diagram illustrating an exemplary network in which concepts described herein may be implemented.

FIG. 1 is a diagram illustrating an exemplary network in which concepts described herein may be implemented. In one implementation, network 100 may include one or more wired and/or wireless networks that are capable of exchanging information, such as voice, video, data, multimedia information, text, etc. For example, network 100 may include one or more public switched telephone networks (PSTNs) or another type of switched network. Network 100 may also include one or more wireless networks and may include a number of transmission towers for receiving wireless signals and relaying the received signals toward the intended destination. Network 100 may further include one or more packet switched networks, such as an Internet Protocol (IP) based network, a local area network (LAN), a wide area network (WAN), a personal area network (PAN), an intranet, the Internet, or another type of network that is capable of exchanging information.

As shown, network 100 may include a presentation network 102, resource management network 104, workflow network 106, virtual system network 108, inventory management network 110, and physical resource network 112. For simplicity and ease of understanding, network 100 of FIG. 1 does not show other network or network components, such as bridges, routers, switches, wireless devices, etc. Depending on the implementation, network 100 may include additional, fewer, or different networks and/or network components.

Presentation network 102 may include devices that interact with users and system administrators. As further shown in FIG. 1, presentation network 102 may include an administrator portal device 102-1 and a user portal device 102-2. Administrator portal device 102-1 may interact with and relay information between a system administrator device, shown as item 120, and resource management network 104. Through the interaction, system administrator device 120 may perform system/network administration tasks (e.g., managing user accounts, performing an action that a user is not authorized to perform, etc.).

User portal device 102-2 may interact with and relay information between a user device, illustrated as item 130, and resource management network 104. User device 130 may access provisioning services that are available via user portal device 102-2. For example, user device 130 may request resource management network 104 to provide user device 130 with a set of virtual machines.

Resource management network 104 may provide provisioning services. In providing the provisioning services, resource management network 104 may track pools of resources that are available to user device 130, reserve a portion of the resources based on a request from user device 130, and allocate the reserved resources to user device 130. In addition, resource management network 104 may deallocate the resources (e.g., return the portion to the pool) when user device 130 indicates that the user does not need the resources.

In addition, resource management network 104 may provide support for administrative tasks (e.g., administer user, perform resource allocation tasks that a user is not authorized to perform, etc.).

As further shown in FIG. 1, resource management network 104 may include a job database device 104-1, resource management database 104-2, and resource management device 104-3. Job database device 104-1 may receive a job description (e.g., a list of tasks) from resource management device 104-3 and store it in an active job queue until the job is performed. Resource management database 104-2 may store and/or retrieve configuration/usage data pertaining to a particular user and/or other bookkeeping information.

Resource management device 104-3 may provision/de-provision resources based on inventory information provided by inventory management network 110. To provision/de-provision the resources, resource management device 104-3 may create description of a job based on user input relayed by user portal device 102-2, based on user configuration, and based on available resources. Resource management device 104-3 may handoff the job description to job database device 104-3, to be placed in the active job queue.

Workflow network 106 may perform jobs whose descriptions are in the active job queue at job database device 104-1. Once the job is performed, workflow network 106 may instruct job database device 104-1 to dequeue the job description. As further shown in FIG. 1, workflow network 106 may include a workflow engine device 106-1, virtual machine management (VMM) control device 106-2, network management device 106-3, and resource lifecycle management device 106-4.

Workflow engine device 106-1 may perform subtasks of a job as defined by a job description in the active job queue at job database device 104-1. In one implementation, workflow engine device 106-1 may poll the active job queue to detect the job description. Workflow engine device 106-1 may request job database device 104-1 to remove the job description from the queue when the subtasks are completed.

In performing each of the subtasks of a job, workflow engine device 106-1 may employ VMM control device 106-2, network management device 106-3, and/or resource lifecycle management device 106-4. Each of the subtasks in the job description may entail allocation, deallocation, controlling, and/or monitoring of virtual resources, physical resources, and/or network resources. For example, assume that user device 130 requests resource management device 104-3 to allocate a virtual machine. In response, resource management device 104-3 may create a job description that includes subtasks for creating a virtual machine, and place the job description at job database device 104-1. When workflow engine device 106-1 is about to perform the subtasks associated with creating the virtual machine, work flow engine device 106-1 may dispatch one or more requests for performing virtual machine-related functions to VMM control device 106-2 (e.g., a request to create the virtual machine).

VMM control device 106-2, upon receiving requests from work flow engine device 106-1, may control and/or monitor one or more virtual machines by interacting with hypervisors. The term "hypervisor," as used herein, may refer to a program that monitors, creates, runs, removes, and/or controls a virtual machine (e.g., controls a lifecycle of a virtual machine) on a physical device. For example, when VMM control device 106-2 receives a request to create a virtual machine from work flow engine device 106-1, VMM control device 106-2 may issue a command to a hypervisor. The hypervisor may create the virtual machine on the host device.

Network management device 106-3 may perform network configuration functions on behalf of work flow engine device 106-1. The functions may include configuring a port, modifying a firewall rule, changing parameters related to ports (e.g., port speed), etc. FIG. 1 shows a number of different types of network objects that network management device 106-3 may manage, such as, for example, a virtual load balancer 108-4, virtual LAN 108-5, and virtual firewall 108-6. Virtual load balancer 108-4, virtual LAN 108-5, and virtual firewall 108-6 are further described below.

Resource lifecycle management device 106-4 may perform subtasks for provisioning a physical hardware device for the user. For example, resource lifecycle management device 106-4 may install an operating system on a server, install an application, etc. As shown in FIG. 1, resource lifecycle management device 106-4 may act on physical server devices 112-1 through 112-3 as well as virtual machines 108-2, as described below.

Virtual system network 108 may include devices and/or components for hosting and implementing virtual machine-related and network component-related resources that may be provisioned for the user. As shown, these resources may include a hypervisor cluster 108-1, virtual machines 108-2, logical volume 108-3, virtual load balancer 108-4, virtual LAN 108-5, and virtual firewall 108-6.

Hypervisor cluster 108-1 may include a logical group of hypervisors and a hypervisor manager (not shown). When hypervisor cluster 108-1 receives a command or a request from VMM control device 106-2 (e.g., create a virtual machine), the hypervisor manager may issue a command/request to a hypervisor. The hypervisor may then create the virtual machine on a host device on which the hypervisor is installed. Depending on the implementation, the hypervisor may be hosted on a hardware device without an operating system, or alternatively, may be hosted as a software component running on top of an operating system.

Virtual machines 108-2 may include a software emulation of a computer system (e.g., a server, a personal computer, etc.). Each virtual machine 108-2 may be instantiated, removed, and managed by a hypervisor. Once created, user device 130 may utilize virtual machine 108-2 as if it were a physical device.

Logical volume 108-3 may include storage on a network (e.g., network attached storage (NAS), a disk on storage area network (SAN), etc.). Local volume 108-3 may be allocated as a resource by work flow engine 106-1. Once allocated, logical volume 108-1 may be mounted on a mount point on a virtual machine and used as storage (e.g., a file system, swap space, etc.). Virtual load balancer 108-4 may include an emulation of load balancer, and may be instantiated or removed upon demand from user device 130. The user may configure virtual load balancer 108-4 such that network traffic is distributed over the virtual and/or physical resources in accordance with specified thresholds (e.g., 40% of network traffic to one of virtual machines 108-2 and 60% of network traffic the other virtual machine). Virtual LAN 108-5 may be created upon demand from user device 130. User device 130 may configure and place selected virtual and physical resources on specific virtual LAN 108-5. Virtual firewall 108-6 may include an emulation of a physical firewall, and may be instantiated or deleted upon demand from user device 130. Once provisioned, virtual firewall 108-6 may be attached to virtual LAN 108-5 to protect the virtual and/or physical resources against undesired network traffic.

Inventory management network 110 may track inventory of network resources and provide inventory information and/or configuration information to resource management network 104. As further shown in FIG. 1, inventory management network 110 may include IP address management device 110-1, data warehouse device 110-2, and an inventory management device 110-3.

IP address management device 110-1 may provision an IP address from a pool of IP addresses. In one implementation, in provisioning an IP address, IP address management device 110-1 may take into account network address translation schemes to identify which VLAN the IP address belongs to, such that an IP address conflict does not arise within the VLAN. When IP address management device 110-1 de-provisions an IP address, IP address management device 110-1 may return the IP address to a pool of IP addresses. Consistent with implementations described herein, more than one IP address may be allocated to a resource, such as a virtual machine 108-2, a physical server 112-x, etc.

Data warehouse device 110-2 may include database of configuration information or configuration management information (e.g., a version of an operating system that is installed on a provisioned physical server for a particular build). When a resource is added to a pool, is provisioned or de-provisioned, data warehouse device 110-2 may update/ record the configuration management information about the resource in the database.

Inventory management device 110-3 may obtain inventory information by monitoring physical devices (e.g., track a physical location of a resource, track its availability for provisioning, etc.), store the inventory information, and/or provide the inventory information to other devices (e.g., the location of the resource, state of the resource (e.g., "provisioned" or "available", etc.). In many instances, inventory management device 110-3 and data warehouse device 110-2 may work together to provide resource management device 104-3 with information to identify physical resources that may be provisioned. For example, resource management device 104-3 may obtain a list of physical devices in network 112 from inventory management device 110-3 and determine which of the listed physical devices are not yet provisioned, based on configuration information provided by database warehouse device 110-2.

Physical resource network 112 may include physical resources. These physical resources may be provisioned/de-provisioned upon a request from resource lifecycle management device 106-4. When physical resources in physical resource network 112 are provisioned, de-provisioned, or (re)-configured, resource lifecycle management device 106-4 may update data warehouse device 110-2 with information about the provisioning and configuration information. In addition, if a number of physical resources in physical resource network 112 increases or decreases (e.g., due a purchase, device failure, etc.), inventory management device 110-1 may record the changes.

As further shown in FIG. 1, physical resource network 112 may include physical resources 112-1 through 112-3 (individually referred to as physical resource 112-x and collectively as physical resources 112-X), logical volume 112-4, and storage device 112-5. Physical resource 112-x may include a physical device or a component that may be provisioned via resource lifecycle management device 106-4. Logical volume 112-4 may include similar component as logical volume 108-3, and may operate similarly. Unlike logical volume 108-3 that is mounted on a virtual machine, however, logical volume 112-3 may be mounted on physical resource 112-x. Storage device 112-5 may include storage from which logical volumes (e.g., logical volume 108-3 or 112-4) may be allocated. Examples of storage device 112-5 may include a SAN disk and NAS devices.

In FIG. 1, although each of networks 102 through 112 are shown as including a number of devices, in an actual implementation, networks 102 though 112 may include additional, fewer, or different components than those shown in FIG. 1. In addition, depending on the implementation, functionalities of each of devices within networks 102-112 may be aggregated over fewer devices or distributed over additional devices. For example, in one implementation, functionalities of devices 112-1 through 112-3 in resource management network 112 may be provided by a single server device.

Figure 2:
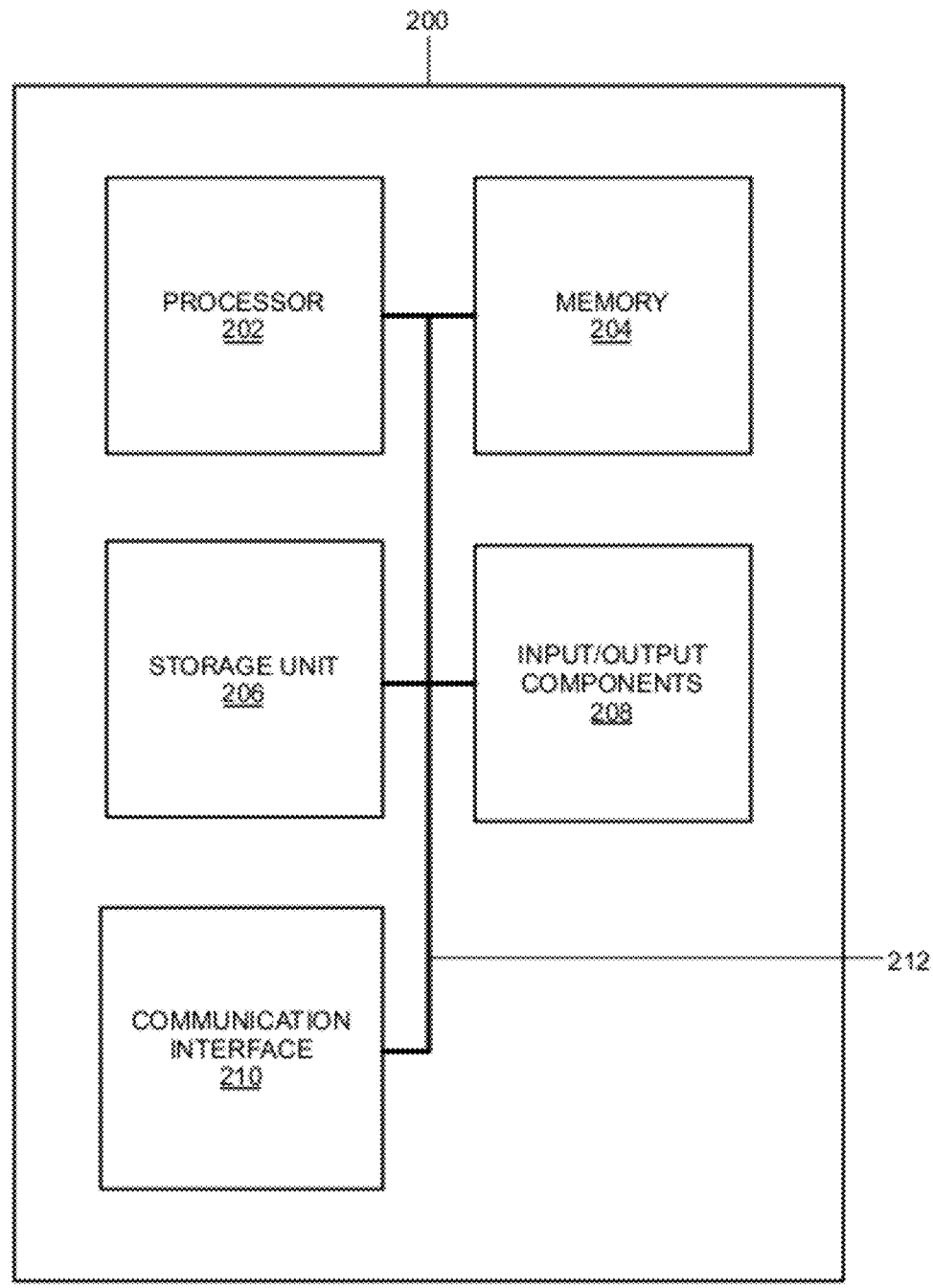
FIG. 2 is a block diagram of an exemplary network device shown in FIG. 1.

FIG. 2 is a block diagram of an exemplary network device 200. Network device 200 may be used to implement each of devices 104-1 through 104-3, 106-1 through 106-4, 110-1 through 110-3, 112-1 through 112-3, and 112-5. In addition, network device 200 may also be used to implement components of a device that hosts a hypervisor. As shown in FIG. 2, network device 200 may include a processor 202, memory 204, storage unit 206, input/output components 208, communication interface 210, and bus 212.

Processor 202 may include one or more processors, microprocessors, application specific integrated circuits (ASICs), field programmable gate arrays (FPGAs), or other processing logic that may interpret and execute instructions. Memory 204 may include static memory, such as read only memory (ROM), and/or dynamic memory, such as random access memory (RAM) or onboard cache, for storing data and machine-readable instructions. Storage unit 206 may include a magnetic and/or optical storage/recording medium. In some embodiments, storage unit 206 may be mounted under a directory tree or may be mapped to a drive. In some implementations, storage unit 206 may be part of another network device (e.g., storage device 112-5).

Input/output components 208 may include a keyboard, a mouse, a speaker, a microphone, a Digital Video Disk (DVD) writer, a DVD reader, Universal Serial Bus (USB) lines, and/or other types of components for converting physical events or phenomena to and/or from digital signals that pertain to network device 200.

Communication interface 210 may include any transceiver-like mechanism that enables network device 200 to communicate with other devices and/or systems. For example, communication interface 210 may include mechanisms for communicating via a network. In these embodiments, communication interface 210 may include one or more network interface cards (e.g., an Ethernet interface) for communicating with other devices. In other implementations, communication interface 210 may include radio frequency (RF) transmitters, receivers and/or transceivers and one or more antennas for transmitting and receiving RF data. Bus 212 may provide an interface through which components of network device 200 can communicate with one another.

In FIG. 2, network device 200 is illustrated as including components 202-212 for simplicity and ease of understanding. In an actual implementation, network device 200 may include additional, fewer, or different components. For example, assuming that network device 200 is a virtual machine, components 202-212 may include virtual components. In another example, network device 200 may include one or more power supplies, fans, motherboards, video cards, etc.

Figure 3:
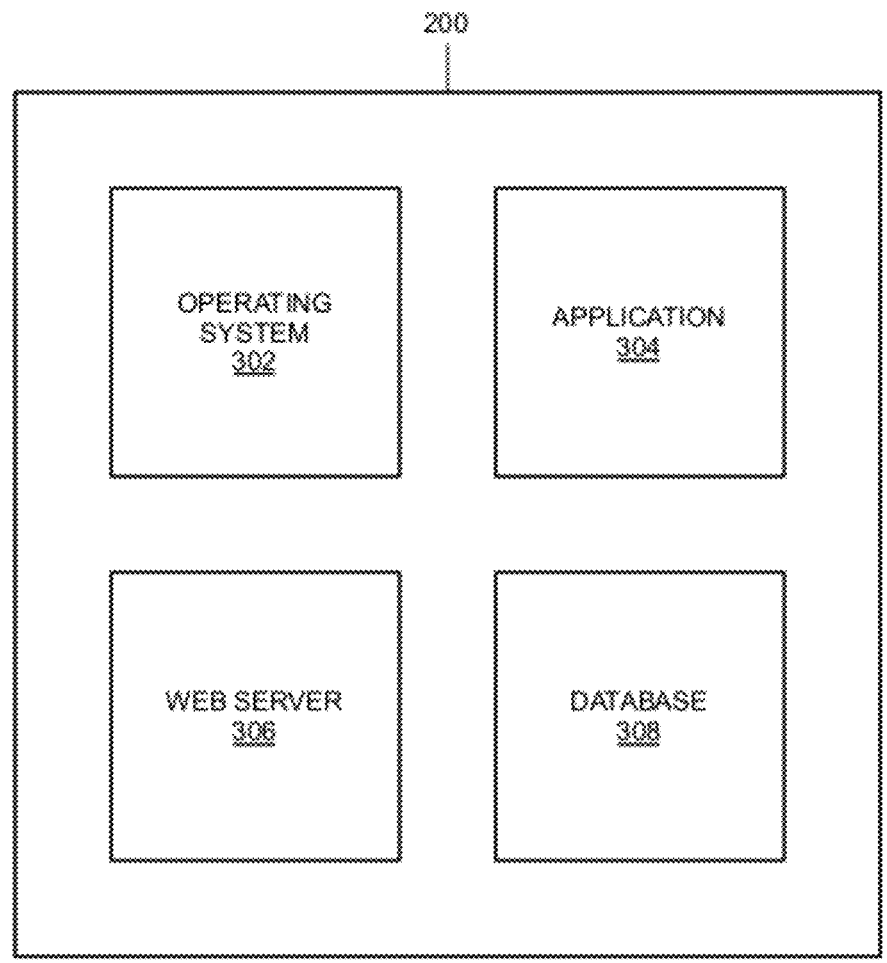
FIG. 3 is a block diagram illustrating exemplary functional components of the network devices shown in FIG. 1.

FIG. 3 is a block diagram illustrating exemplary functional components of network device 200. As shown, network device 200 may include an operating system 302, application 304, web server 306, and database 308. Depending on the implementation, network device 200 may include additional, fewer, or different components than those illustrated in FIG. 3.

Operating system 302 may manage hardware and software resources of network device 200. Operating system 302 may manage, for example, its file system, device drivers, communication resources (e.g., transmission control protocol (TCP)/ IP stack), event notifications, etc.

Application 304 may include software program and/or scripts for rendering services. For example, in resource management device 104-3, application 304 may take the form of one or more programs for provisioning resources. Other examples of application 304 include a file transfer protocol (FTP) server, an email server, a telnet server, servlets, Java™ virtual machine (JVM), web containers, firewall, components to support Authorization, Authentication and Accounting (AAA), and other applications that either interact with client applications or operate in stand-alone mode. In addition, application 304 may include a specialized server program, application server, web page, etc.

Web server 306 may include a software application for exchanging web page related information with one or more browsers and/or client applications. Database 308 may include records and files and may act as an information repository for network device 200. For example, in resource management database 104-2, database 308 may store and retrieve configuration/usage data pertaining to a particular user. In another example, database 308 in job database device 104-1 may implement persistent queues for storing job descriptions. In such implementations, the queue may be robust and, therefore, recoverable upon device failure.

Figure 4:
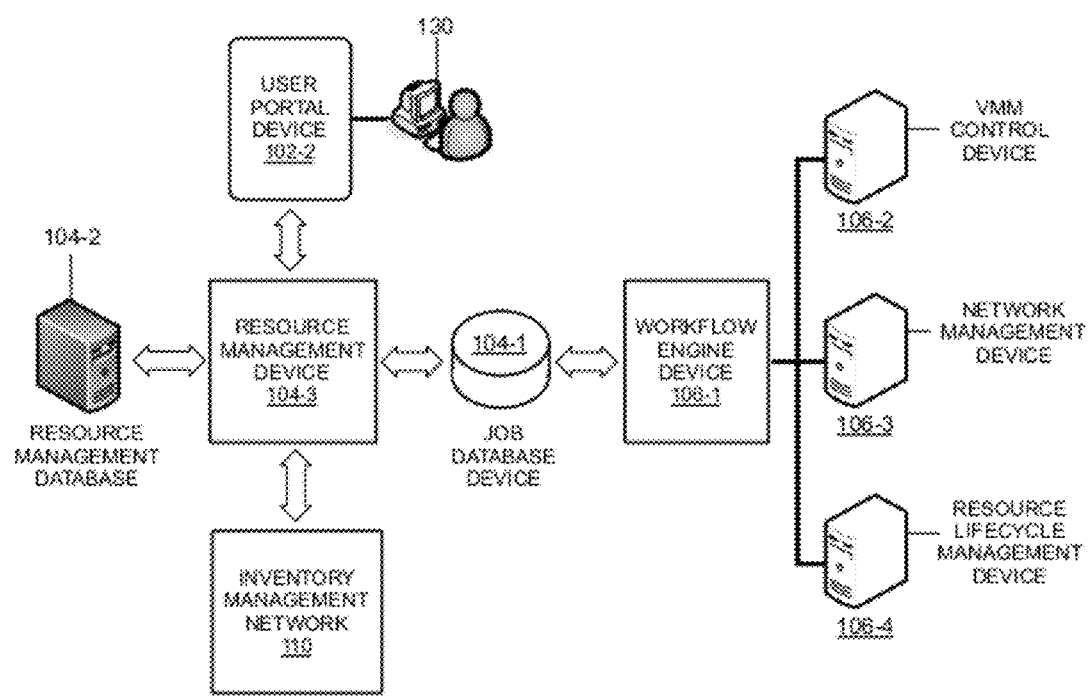
FIG. 4 is a diagram illustrating exemplary interaction between devices of FIG. 1 for provisioning and/or managing resources.

FIG. 4 illustrates an exemplary interaction between the devices of FIG. 1 for provisioning and/or managing resources consistent with implementations described herein. As shown in FIG. 4, user device 130 may interact with resource management device 104-3 via user portal device 102-2. For example, resource management device 104-3 may provide a web-based interface for controlling, monitoring, provisioning, and/or de-provisioning resources.

As further shown in FIG. 4, user portal device 102-2 may provide a user request for provisioning to resource management device 104-3. In response, resource management device 104-3 may obtain user-related information and information on farm objects from resource management database 104-2. As used herein, the term "farm object" may refer to an object that contains a collection of objects that represent network devices and/or networks. In addition, resource management device 104-3 may obtain inventory information and configuration information from inventory management network 110. Resource management device 104-3 may collect such information to create a job description for provisioning a farm and/or network devices (e.g., server devices). The job description may be sent to job database device 104-1.

Workflow engine device 106-1 may poll job database device 104-1. When workflow engine device 106-1 discovers a new job at job database device 104-1, workflow engine device 106-1 may examine each of the subtasks described in the job description, and dispatches each subtask to one of three devices, VMM control device 106-2, network management device 106-3, and/or resource lifecycle management device 106-4. As discussed above, VMM control device 106-2, network management device 106-3, and resource lifecycle management device 106-4 may aid in provisioning virtual machines and related components, network components (e.g., virtual firewall), and physical devices.

In FIG. 4, a user at user device 130 may interact with resource management device 104-3 to provision and/or manage physical and/or virtual resources in networks 102-112. To facilitate the provisioning and/or management process, resources that the user can be provisioned with may be represented at resource management device 104-3 by a resource object that models characteristics of physical or virtual resources in networks 102-112.

Figure 5:
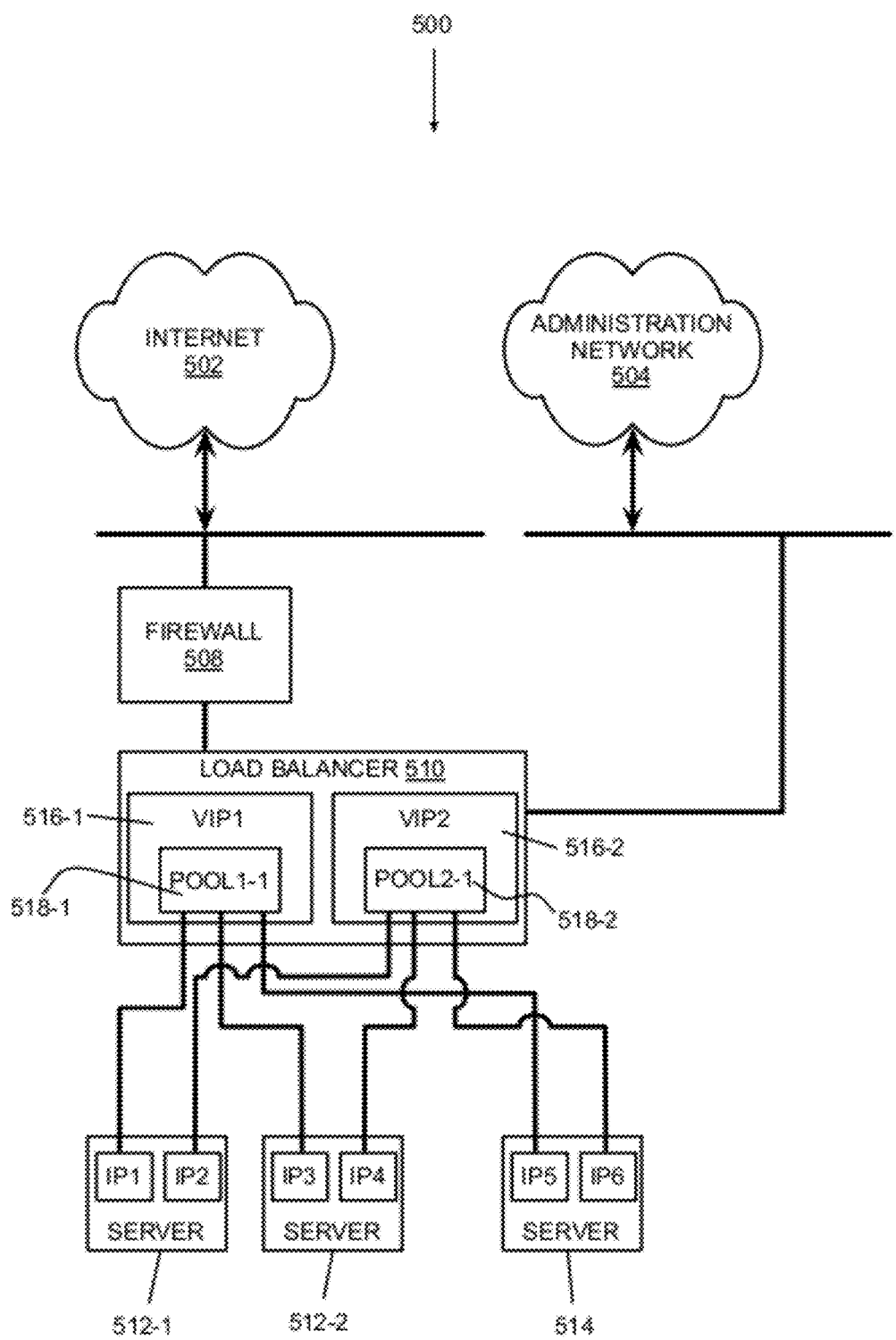
FIG. 5 is a diagram of exemplary resources for provisioning the network of FIG. 1.

FIG. 5 is a diagram of exemplary resources that network 100 may provision. As shown in FIG. 5, a user may be provisioned with connectivity to the Internet 502, administration network 504, firewall 508, load balancer 510, virtual server devices 512-1 and 512-3, and physical server device 514.

Administration network 504 may provide services such as a backup service, security service, billing, etc. Firewall 508 may safeguard virtual server devices 512-1 and 512-2 and physical server device 514 from outside networks via enforcement of firewall security rules and/or network address translation (NAT). Virtual server devices 512-1 and 512-2 may host applications in virtual environments. Physical server device 514 may host applications in physical devices. Each of physical server devices 514 may access one or more storage devices (not shown).

The user at user device 130 may request network 100 to provision the user with one or more instances of network 500, each containing one or more components 508-514 and access to networks 502 and 504 via user portal device 102-2. For example, via a web interface, a user at user device 130 may specify number of virtual machines, physical devices, and/or network components for provisioning.

Load balancer 510 may be configured (e.g., via network 100) to provision or create virtual IPs (VIPs) 516-1 and 516-2 (also referred to as load balancing resource pools 516). As used herein, the term "VIP" or "load balancing resource pool" refers to a grouping (e.g., one or more) servers or other storage devices or resources across which load may be balanced by load balancer 510. In one implementation, creation of a particular VIP associates a public IP address (e.g., reachable from Internet 502) with the VIP, either automatically from a pool (e.g., via dynamic host control protocol (DHCP)) or specified by the user.

Each VIP 516 may include one or more server pools 518. For example, as shown in FIG. 5, VIP 516-1 includes server pool 518-1 and VIP 516-2 includes server pool 518-2. In practice, VIPs 516 may include more than one pool. As used herein, the term "server pool" refers to a subset of the VIP member server devices associated with particular network services, such as a web server, an FTP server, an application host, etc. In some implementations, each server pool may be associated with a particular pool port number, such that services associated with the pool port number are balanced across members of the respective server pool.

As shown, one or more of resources 512 and 514 may be provided with multiple IP addresses. For example, as described below, virtual server 512-1 may be configured to have a primary IP address and one or more secondary IP addresses. By providing multiple IP addresses to a single server device 512-1, multiple resources (e.g., web sites, FTP sites, etc.) with different IP addresses may be provisioned on a single server.

For example, virtual server device 512-1 may be assigned IP1 and IP2, virtual server device 512-2 may be assigned IP3 and IP4, and physical server device 514 may be assigned IP5 and IP6. Once assigned, these IP addresses may be associated with different VIPs 516 and/or server pools 518. For example, pool 518-1 in VIP 516-1 has as its members, IP1 in virtual server 512-1, IP3 in virtual server 512-2, and IP5 in physical server 514. Similarly, pool 518-2 in VIP 516-2 has as its members, IP2 in virtual server 512-1, IP4 in virtual server 512-2, and IP6 in physical server 514. By providing multiple IP addresses with a single server device, multiple services (e.g., web sites) may be served without requiring the provisioning of dedicated resources (e.g., servers).

Figure 6A:
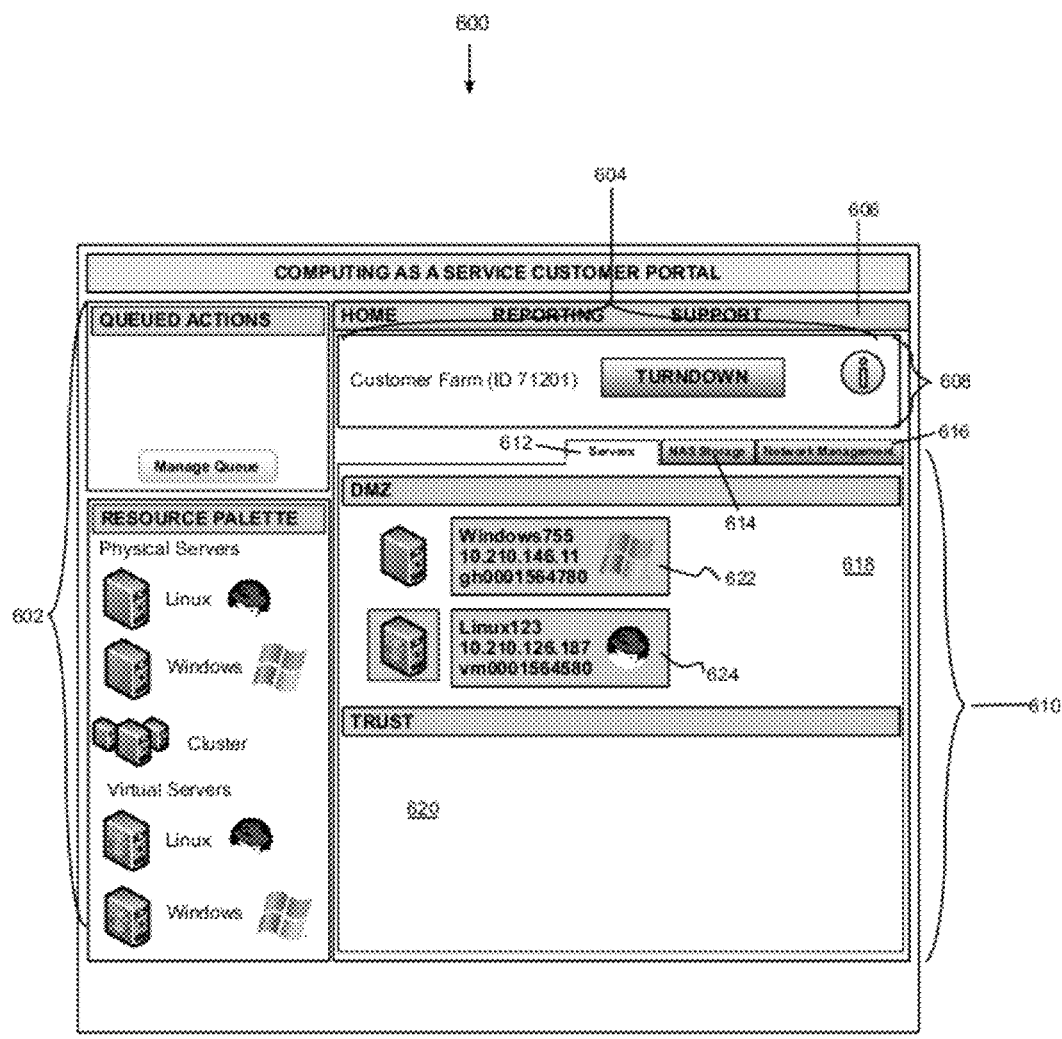
FIGS. 6A-6F are exemplary views of a web-based user interface for controlling, monitoring, provisioning, and/or de-provisioning resources consistent with implementations described herein.

FIG. 6A illustrates an exemplary view 600 of a web-based user interface for controlling, monitoring, provisioning, and/or de-provisioning resources. More specifically, view 600 shows a web page for monitoring provisioned resources. Some features of a typical web browser, such as navigation bar, are not illustrated for the sake of ease in presentation.

As shown, the web page may include a side pane 602, an identification/turndown section 604, and a configuration section 610. Side pane 602 may include a list or "palette" of available server types (e.g., Windows®, Linux, cluster, etc.), and a listing of jobs that are pending for execution (e.g., by workflow engine 106-1). Identification/turndown section 604 may include an identification of a particular user account being managed/provisioned, a menu bar 606 and shortcut buttons 608. Menu bar 606 may provide links to other web pages, such as "Home," "Reporting," and "Support" pages. Shortcut buttons 608 may include buttons for executing commands, e.g., "turndown" or additional information. Configuration section 610 may include a number of tabs for providing different information, including a servers tab 612, a NAS storage tab 614, and a network management tab 616. Depending on the implementation, the web page may include additional, fewer, or different features than those shown in FIG. 6.

As shown in FIG. 6A, servers tab 612 provides a listing or view of available servers that are currently accessible and associated with a particular customer (e.g., customer farm ID 71201 in FIG. 6A). In some implementations, the servers displayed in servers tab 612 are separated based on the type of access provided, such as a DMZ section 618 and a Trust section 620. Servers listed in DMZ section 618 are publicly accessible, e.g., via the Internet, while servers listed in Trust section 620 are accessibly only within one or more private networks or VLANs. As shown in FIG. 6A, two servers 622 and 624 are listed in DMZ section 618 of servers tab 612 and no servers are listed in Trust section 620. In this example, server 622 relates to physical Windows server with private IP address 10.210.146.11 and server 624 relates to a virtual Linux server with private IP address 10.210.126.187. The provided web page may receive a user request to display server options for a particular one of the listed servers (e.g., server 624), such as by the user clicking on the icon associated with the particular server.

Figure 6B:
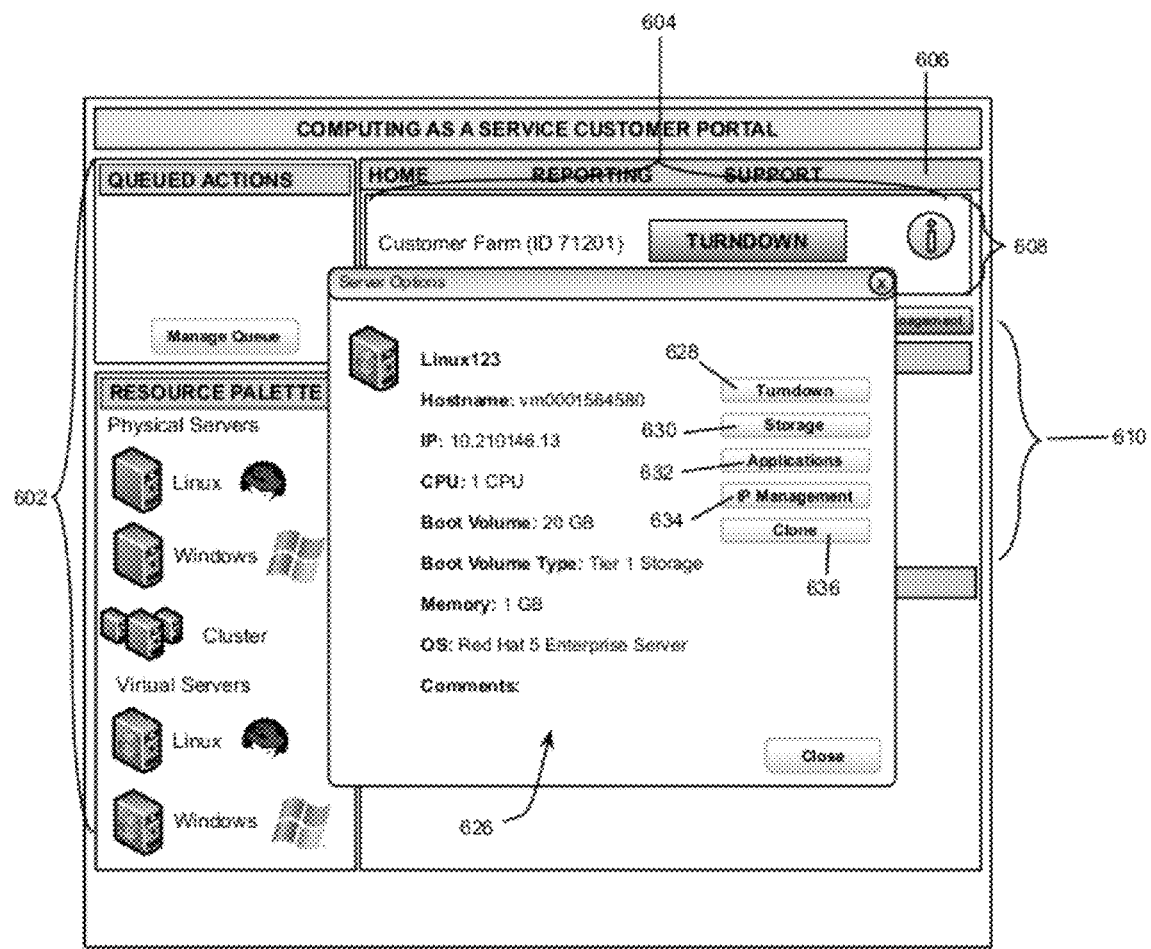

FIG. 6B illustrates exemplary view 600 following user selection of a particular server from servers tab 612 (e.g., server 624). Selection of a particular server from servers tab 612 may cause the web page to display a user Server Options dialog 626. Server Options dialog 626 may provide information relating to the selected server, such as the server's label or name, hostname, private IP address, CPU type, storage type, memory type, operating system, etc. In addition to server information, Server Options dialog 626 may also provider a number of user-configurable options relating to the selected server, including a turndown option 628, a storage option 630, an applications option 632, an IP management option 634, and a clone option 636.

User selection of turndown option 628 may disable access to the selected server. Selection of storage option 630 may provide the user with an interface for changing the amount of storage or type of storage associated with the selected server. User selection of applications option 632 may provide the user with an interface for selecting, installing, and/or modifying applications executing on the selected server. User selection of clone option 636 may cause the settings, applications, etc. associated with a selected server to be copied or cloned to a new server (or cluster of servers).

Figure 6C:
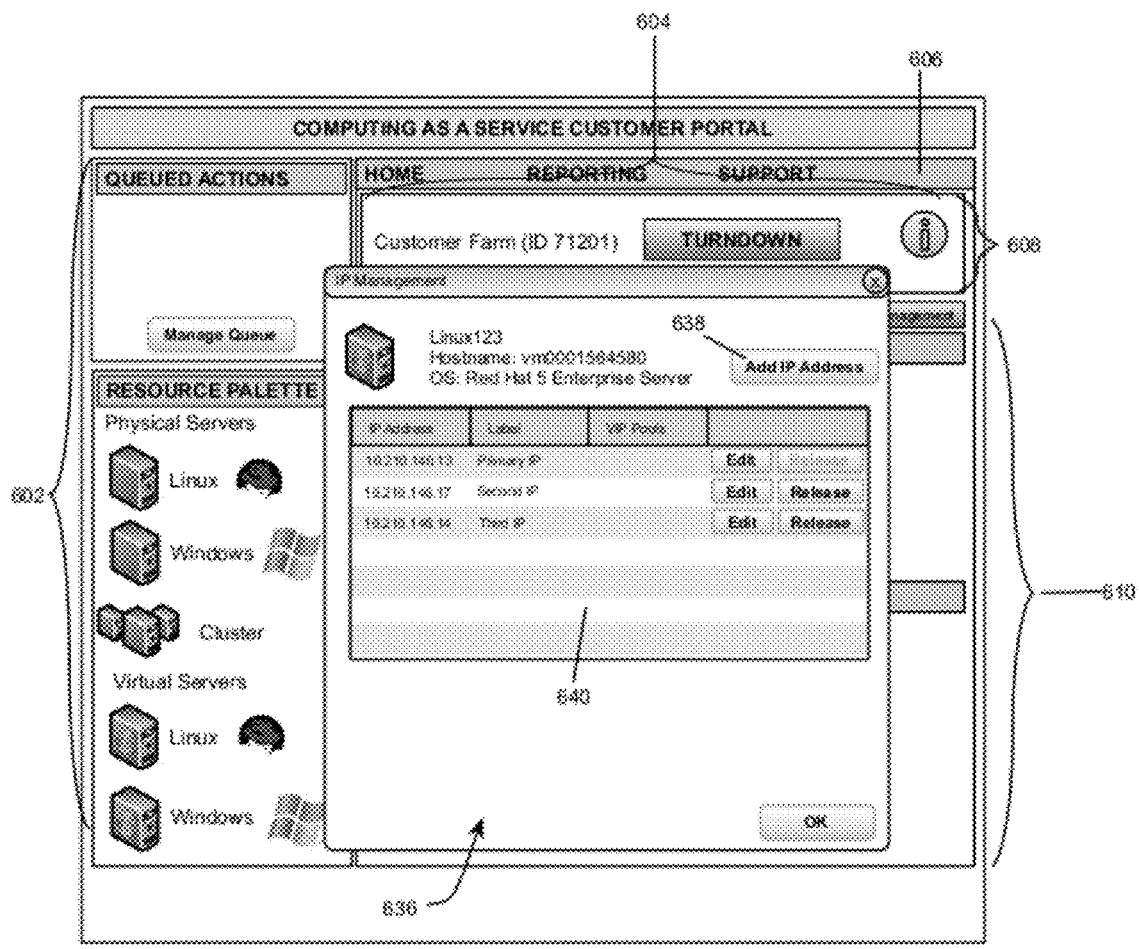

Consistent with implementations described herein, user selection of IP management option 634 may enable a user to assign additional IP addresses to the selected server (e.g., server 624). FIG. 6C illustrates exemplary view 600 following user selection of IP management option 634 in server options dialog 626. Selection of IP management option 634 may cause the web page to display an IP management dialog 636, as shown in FIG. 6C. IP management dialog 636 may provide information relating to the selected server, such as label/name, hostname, and operating system. IP management dialog 636 may include an add IP address option 638 and a listing 640 of assigned IP addresses. As shown, each entry in listing 638 may designate the associated IP address, label (e.g., primary, secondary, test, etc.), and a designation of any VIP pools that the IP address is assigned to. As described above, VIP pools relate to IP address/port number combinations.

If a user wishes to add an additional IP address to the selected server, the user may select add IP address option 638. In response, the web page may provide an interface that allows the user to select from among a number of available IP addresses, manually enter an IP address, provide label information, etc. In one implementation, users may not enter VIP pool information directly within IP management dialog 636. Rather, the VIP pool information is automatically generated when the IP address is added to a VIP pool in the manner described below.

Upon selection of add IP address option 638, resource management device 104-3 may execute a server IP address registration function. Execution of the server IP address registration function may cause resource management device 104-3 to request/reserve an available IP address from the pool of IP addresses maintained by IP management device 110-1. Consistent with implementations described herein, IP address reservation may be accomplished directly by resource management device 104-3 and may not require entry of a job into jobs database 104-1 and corresponding execution of such a job by workflow engine 106-1. For example, as described in detail below, information relating to IP addresses associated with the selected server may be updated within a resource management database 104-2.

Upon reservation of a new IP address, resource management device 104-3 may add an add IP address job in jobs database 104-1 for execution by workflow engine 106-1. During execution of the job by workflow engine 106-1, a function or script may be executed on network management device 106-3 (e.g., a server automation script) to cause network management device 106-3 to bind the new IP address to the identified server.

Each listing in IP address listing 640 may include an edit option 642 and a release option 644. User selection of edit option 642 associated with a particular IP address may cause the web page to provide an interface for enabling the user to edit parameters associated with the selected IP address, such as the label or the IP address itself. Consistent with implementations described herein an IP address labeled as a primary IP address may not be released from the server. That is, each server must include at least a primary IP address. For non-primary IP addresses, selection of release option 644 may cause resource management device 104-3 to execute a server IP address release function. Execution of the server IP address release function may cause resource management device 104-3 to return the identified (non-primary) IP address to the pool of IP addresses maintained by IP management device 110-1.

Upon receipt of a user selection to release an IP address, resource management device 104-3 may add a remove IP address job in jobs database 104-1 for execution by workflow engine 106-1. During execution of the job by workflow engine 106-1, a function or script may be executed on network management device 106-3 (e.g., a server automation script) to cause network management device 106-3 to unbind the selected IP address from the identified server.

Figure 6D:
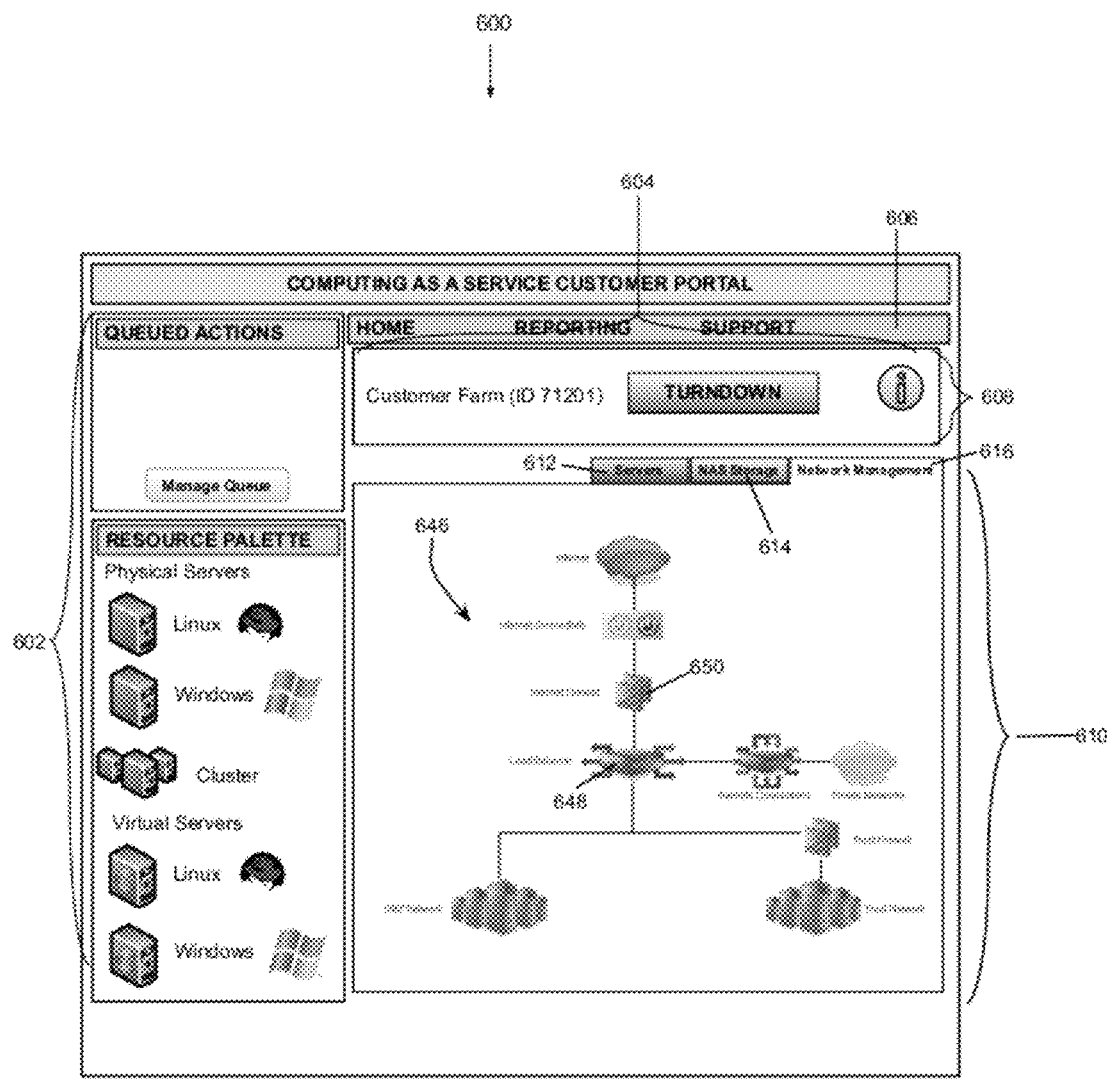

FIG. 6D illustrates exemplary view 600 following user selection of network management tab 616 (shown in FIG. 6A). As shown in FIG. 6D, activating network management tab 616 provides an interactive diagram 646 graphically depicting the network configuration associated with account identified in identification/turndown section 604. Interactive diagram 646 may include a load balancer icon 648 and a firewall icon 650. Clicking on or otherwise selecting load balancer icon 648 or firewall icon 650 enables configuration of load balancer 108-4 and firewall 108-6.

Figure 6E:
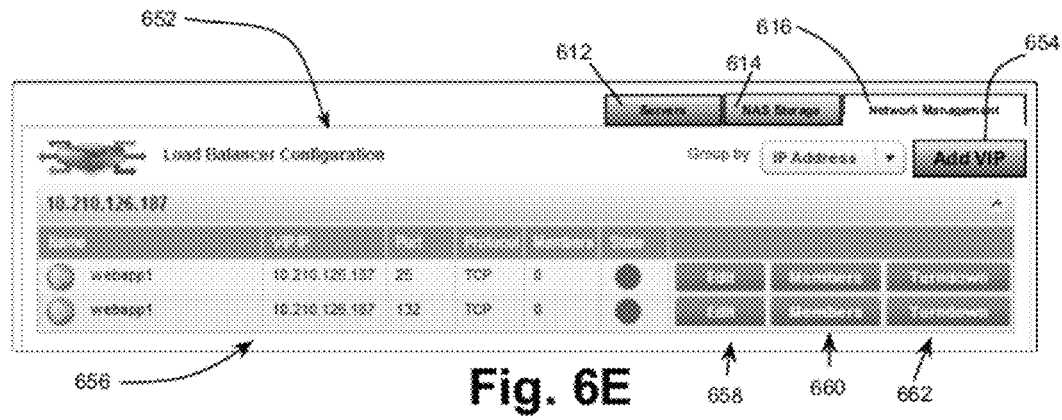

FIG. 6E illustrates an exemplary network management tab 616 that is displayed upon selection of load balancer icon 648 in FIG. 6D. More specifically, network management tab 616 may include a load balancer configuration interface 652 that provides information and configuration options for configuring load balancer 108-4. Load balancer configuration interface 652 may include an add VIP option 654, and, for each established VIP, a listing 656 of server pools associated with the VIP. As described above, a server pool refers to a particular port number associated with the public IP for the VIP. Additionally, for each server member in listing 656, interface 652 may provide edit, members, and turndown options 658, 660, and 662, respectively. Consistent with implementations described herein, selection of members option 660 may enable a user to add one or more server IP addresses to a pool, such as secondary or non-primary IP address configured with a particular server in the manner described above.

Figure 6F:
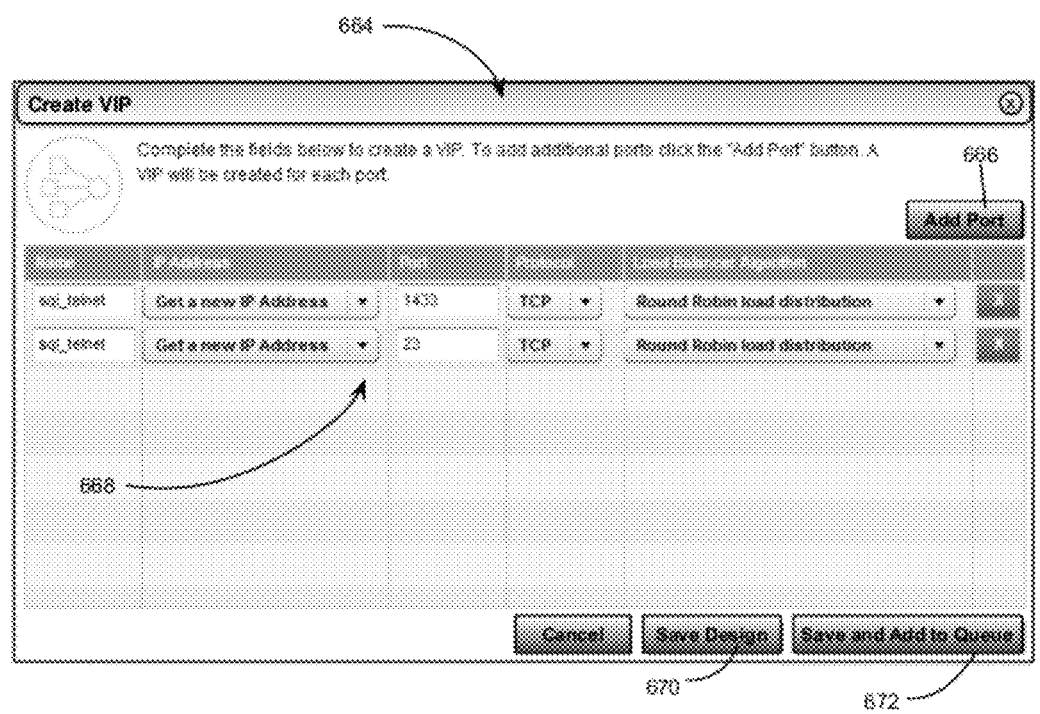

FIG. 6F is a exemplary create VIP dialog 664 provided in response to a user selection of add VIP option 654 in load balancer configuration interface 652. As shown, create VIP dialog 664 may include an add port option 666 and a listing 668 of VIP ports (e.g., server pools) to be created. Consistent with implementations described herein, any number of ports may be added to a particular VIP. Selection of add port option 666 places a new entry in listing 668 with user completed sections for VIP name, IP address, port number, protocol, and load balancing algorithm to apply. As described above, the IP address included in listing 668 may be selected to include one of the secondary (e.g., non-primary IP address) assigned to a particular server in the manner described above.

Create VIP dialog 664 further provides options to save 670 and save and add to queue 672. Selection of save option 670 saves the configured VIP, but does not forward any associated functions to resource management device 104-3. Selection of save and add to queue option 672 saves the configured VIP and forwards functions associated with the configuration to resource management device 104-3 for execution by workflow engine device 106-1.

Figure 7:
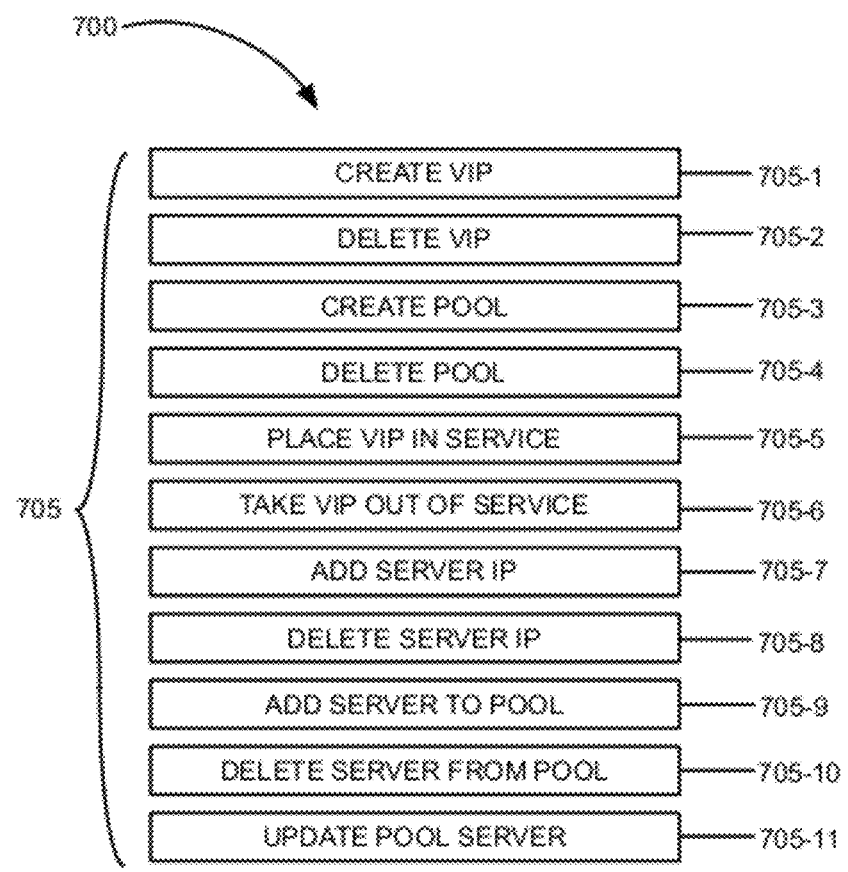
FIG. 7 illustrates a listing of exemplary functions for adding a server with a secondary IP address to the load balancer of FIG. 1.

FIG. 7 provides a listing of exemplary functions 700 that resource management device 104-3 and/or workflow engine device 106-1 may support for provisioning and/or managing load balancers 108-4 and firewalls 108-6. As shown, resource management device 104-3 and/or workflow engine device 106-1 may be requested to perform functions 705-1 through 710-11 for load balancers 108-4. For example, when a resource management device 104-3 receives, from user device 130, a service request to configure a load balancer 108-4 to include a particular, VIP, pool, or pool member, resource management device 104-3 may execute one or more of functions 705-1 to 705-11, as described below. This may generate one or more a job descriptions for provisioning and/or configuring load balancer 108-4 and hand off the job descriptions to job database device 104-1 for execution by workflow engine device 106-1. Depending on the implementation, resource management device 104-3 and/or workflow engine device 106-1 may provide support for other functions and/or other types of devices.

Functions 700 may include load balancer functions 705 that enable and support the provisioning and configuration of a load balancer 108-4 to establish a pool of physical or virtual servers (referred to as a virtual IP or load balancing VIP). More specifically, functions 705 may enable the provisioning and deprovisioning of secondary server IP addresses (e.g., IP addresses associated with server devices that also include another primary IP address) to server pools and/or VIPs.

As shown, load balancer functions 705-1 to 705-11 may include create VIP 705-1, delete VIP 705-2, create pool 705-3, delete pool 705-4, place VIP in service 705-5, take VIP out of service 705-6, add server IP 705-7, delete server IP 705-8, add server to pool 705-9, delete server from pool 705-10, update pool server 705-11.

Create VIP function 705-1 may create or provision a new VIP within a virtual load balancer 108-4. In one exemplary embodiment, create VIP function 705-1 may be queued in jobs database following user entry of information in create VIP dialog 664 and selection of save and add to queue option 672 described above in relation to FIG. 6F. In one implementation, execution of create VIP function 705-1 may generate a new public virtual Internet protocol (VIP) address associated with the new VIP. In other implementations, create VIP function 705-1 may receive a specified IP address from user device 130. In addition, create VIP function 705-1 may also facilitate creation of a VIP for a particular port, protocol, and load balancing algorithm type (e.g., round robin, weighted round robin, least connections, etc.).

In one embodiment, VIPs are initially generated in an out of service state, awaiting addition of pool members. Consistent with implementations described herein, a job request for execution of create VIP function 705-1 may invoke the execution of a load balancer VIP creation script on a network management device 106-3 to provision and configure load balancer 108-4.

Delete VIP function 705-2 may delete or deprovision a VIP within virtual load balancer 108-4. In one implementation, execution of delete VIP function 705-2 may delete the VIP address associated with a previously established VIP. Consistent with implementations described herein, a job request for execution of delete VIP function 705-2 may invoke the execution of a load balancer VIP delete script on network management device 106-3 to configure load balancer 108-4.

Create pool function 705-3 may create or provision a server pool for a VIP created via function 705-1. In one implementation, create server pool function 705-3 may be called based on receipt of port and pool name information, among other elements, via create VIP dialog 664 described above in relation to FIG. 6F. Consistent with implementations described herein, a job request for execution of create server pool function 705-3 may invoke the execution of a load balancer pool create script on a network management device 106-3 to provision and configure load balancer 108-4.

Delete pool function 705-4 may delete or deprovision a server pool from within an established VIP on load balancer 108-4. In one implementation, execution of delete pool function 705-4 may delete a previously established server pool associated with a previously established VIP. Consistent with implementations described herein, a job request for execution of delete pool function 705-4 may invoke the execution of a load balancer pool delete script on network management device 106-3 to provision and configure load balancer 108-4. Consistent with implementations described herein, server pool creation or deletion via functions 705-3 and 705-4 may be automatically invoked upon creation and deletion of a VIP via functions 705-1 and 705-2.

Place VIP in service function 705-5 may change the state of an established VIP from out of service to in service. Consistent with implementations described herein, a job request for execution of place VIP in service function 705-5 may invoke the execution of a load balancer VIP in service script on network management device 106-3 to provision and configure load balancer 108-4. In exemplary embodiments, execution of the place VIP in service function 705-5 requires that the VIP be previously established.

Take VIP out of service function 705-6 may change the state of an established VIP from in service to out of service. Taking a VIP out of service enables server pools and pool members (e.g., servers) to be added to the VIP. In addition, following execution of function 705-6, active connections and sessions to any server devices in the VIP will be discontinued. To allow connections to timeout, take pool server out of service function 705-12 may be executed. Consistent with implementations described herein, a job request for execution of take VIP out of service function 705-6 may invoke the execution of a load balancer VIP out of service script on network management device 106-3 to provision and configure load balancer 108-4.

Add server IP function 705-7 may add or provision a server (e.g., a virtual or physical server having a particular IP address, such as a secondary or primary IP address) to load balancer 108-4. Consistent with implementations described herein, a job request for execution of add server function 705-7 may designate any available server IP address, including non-primary server IP addresses assigned to a server in the manner described above. In one implementation, add server IP function 705-7 may be called based on receipt of IP address information, among other elements, via create VIP dialog 664 described above in relation to FIG. 6F. Accordingly, a parameter of add server IP function 705-7 may include a secondary or non-selected IP address associated with the desired server, as well as identifiers associated with the VIP, the hostname of the server, and a service state identifier.

In addition, execution of add server IP function 705-7 may invoke the execution of a load balancer real IP create script on network management device 106-3 to provision and configure load balancer 108-4. In one exemplary implementation, execution of add server IP function 705-7 may cause workflow engine device 106-1 to determine whether a particular server (e.g., a server having the designated IP address (e.g., primary or non-primary IP address)) has been previously added to the load balancer 108-4. If so, the designated server will not be added to the load balancer 108-4 a second time. Rather, the previously created server may be added to a particular VIP server pool via function 705-9.

Delete server IP function 705-8 may remove or de-provision a previously added server (e.g., a virtual or physical server) from load balancer 108-4. In some implementations, function 705-8 may be invoked upon deletion of a designated server IP from a last pool on load balancer 108-4 (e.g., via function 705-10). Consistent with implementations described herein, a job request for delete server IP function 705-8 may invoke the execution of a load balancer real IP delete script on network management device 106-3 to provision and configure load balancer 108-4.

Add server to pool function 705-9 may add a server (e.g., a virtual or physical server) to an established server pool associated with a particular VIP (e.g., created via create pool function 705-3). Consistent with implementations described herein, a job request for execution of add server to pool function 705-9 may designate a particular VIP, a particular server pool, and designated server IP address. In addition, execution of add server to pool function 705-9 may invoke the execution of a load balancer real IP in pool script on network management device 106-3 to provision and configure load balancer 108-4. Execution of add server to pool function 705-9 may only be performed for established VIPs, established server pools, and for servers IPs (e.g., primary or non-primary server IP addresses) added to the load balancer 108-4 (e.g., via function 705-7).

Delete server from pool function 705-10 may delete a server (e.g., a virtual or physical server) from an established server pool. Consistent with implementations described herein, a job request for execution of delete server from pool function 705-10 may designate a particular VIP, a particular server pool, and designated server IP address. In addition, execution of delete server from pool function 705-10 may invoke the execution of a load balancer real IP out of pool script on network management device 106-3 to provision and configure load balancer 108-4. In addition, workflow engine device 106-1 may be configured to determine whether the server being removed from the pool is the last server in the last pool associated with the VIP. If so, workflow engine device 106-1 may automatically invoke delete server from VIP function 705-8.

Update pool server function 705-11 may change the state of (e.g., update) an established server in an established pool from out of service to in service or vice-versa. Consistent with implementations described herein, a job request for execution of place pool server in service function 705-11 may invoke the execution of a load balancer server update script on network management device 106-3 and may accept, as input parameters, the server IP address (e.g., primary or non-primary server IP address), the VIP address, the pool port, and the updated service state (e.g., in service or out of service). In exemplary embodiments, execution of place pool server in service function 705-11 requires that the VIP be previously established.

Consistent with implementations described herein, a database structure representing the relationships between VIPs 516, pools 518, IP addresses, server devices 512/514, etc. may be modified to reflect a change from implementations in which each server device 512/514 is associated with one and only one IP address to an implementation in which multiple IP addresses are assigned to a single server device 512/514 in the manner described above.

For example, in one embodiment, a new database table may be inserted between a load balancer real server table and a server table. Unlike the former one to one relationship between the load balancer real server table and the server table reflecting the single IP address for each load balancer real server, a new database table (referred to as a server IP table) may establish a one to many relationship with the server table and a one to one relationship with the load balancer real server table. The new server IP table includes a listing of all IP addresses associated with a particular server. This allows a single load balancer real server to be associated with multiple IP addresses and hence multiple servers.

For example, as described above, during execution of the IP reserve function that occurs following user addition of a new IP address to a selected server, the server IP table associated with the server may be updated to reflect the new IP address. This allows subsequent use of the IP address during VIP and server pool creation. In one embodiment, the primary IP address may be listed in both the server IP table and the server table. This may enable backward compatibility with existing code and may require changes to only the server IP table upon addition and release of non-primary IP addresses.

In another implementation, instead of using a new table to relate the load balancer real server and the multiple server IPs, the load balancer real server table may be modified to include a one to many relationship with the server table. In this embodiment, an IP address column in the load balancer real server table may be added to list or include the IP addresses associated with the server. Similar to the embodiment above, during execution of the IP reserve function that occurs following user addition of a new IP address to a selected server, the load balancer real server table associated with the real server may be updated to reflect the new IP address. This allows subsequent use of the IP address during VIP and server pool creation.

Figure 8A:
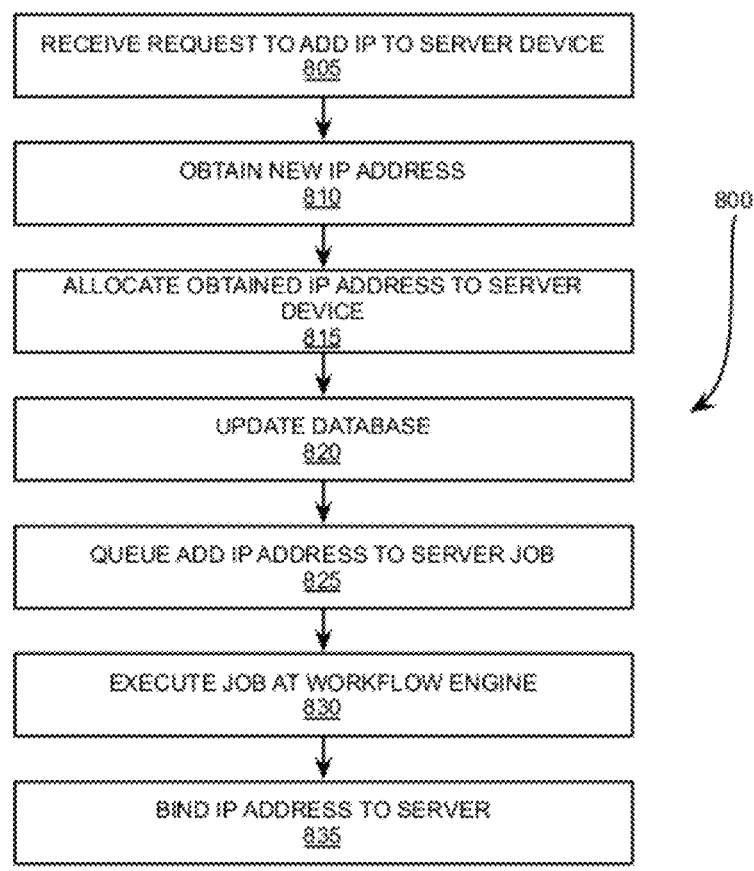
FIGS. 8A-8B are flow diagrams of an exemplary processes associated with provisioning additional IP addresses to a server device in a computing as a service environment.

FIG. 8A is a flow diagram of an exemplary processes 800 associated with provisioning additional IP addresses to a server device in a computing as a service environment. Although networks 104-112 may implement other processes for provisioning, de-provisioning, monitoring, and/or controlling other resources, they are not illustrated for the sake of simplicity and ease of understanding.

Process 800 may begin upon receipt of a user request to add an IP address to a previously provisioned server device (block 805). For example, the user may select add IP address option 638 in web page view 600. Prior to providing interface view 700 to the user, customer web portal device 102-2 may have provided other resource configuration views or web pages for receiving resource selections and configuration information, such as port numbers, numbers of virtual or physical machines, load balancer/firewall configuration settings, etc.

In response to the user selection of add IP address option 638, resource management device 104-3 may obtain a new IP address for the selected server (block 810). For example, resource management device 104-3 may execute a server IP address registration function to request/reserve an available IP address from the pool of IP addresses maintained by IP management device 110-1. IP address management device 110-1 may allocate the obtained IP address to the selected server (block 815). Resource management device 104-3 may update one or more database entries associated with the selected server to reflect the new IP address (block 820).

Once the new IP address has been reserved and associated with the identified server, resource management device 104-3 may add or queue an add IP address to server function in job database device 104-1 for execution by workflow engine 106-1 (block 825). Workflow engine device 106-1, which polls/checks job database device 104-1, may detect and execute the add IP address to server job at job database device 104-1 (block 830). Execution of the job may cause the new IP address to be bound to the selected server (block 885). For example, workflow engine 106-1 may cause a script to be executed by network management device 106-3 to bind the IP address to the selected server.

Figure 8B:
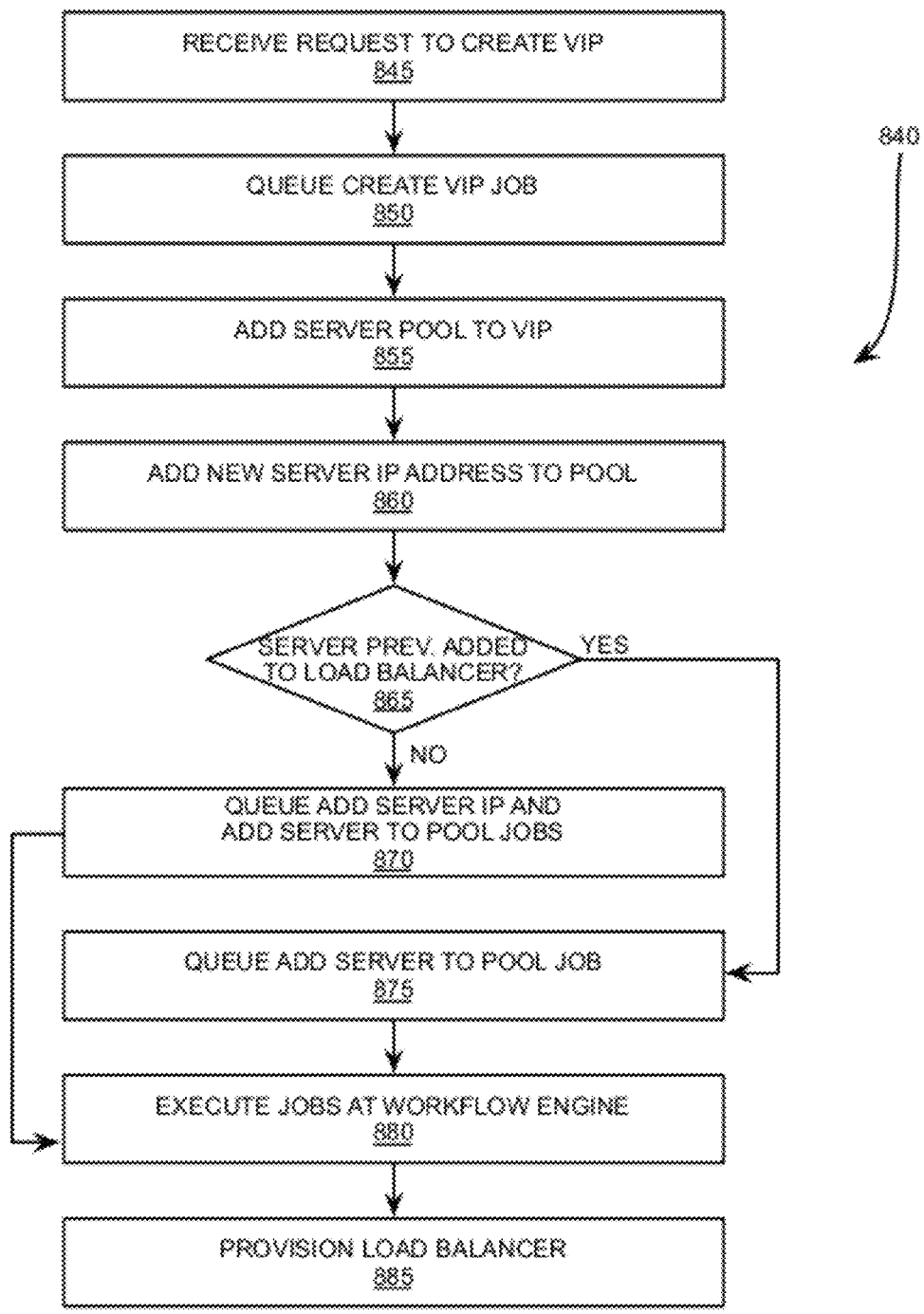

FIG. 8B is a flow diagram of an exemplary processes 840 associated with configuring a load balancer to include the server IP address provisioned in process 800. Initially, Process 840 may begin with resource management device 104-3 receiving a request (e.g., via user portal device 102-2) to create a VIP associated with a user account (block 845). The VIP may designate a public IP address, a port, a protocol, and a service state. Receipt of this request may cause queuing of create VIP function 705-1 as a job in job database device 104-1 for execution by workflow engine 106-1 (block 850).

A server pool may be added to the VIP via queuing of create pool function 705-3 in job database device 104-1 for execution by workflow engine 106-1 (block 855). As described above, server pools refer to specific port numbers associated with an IP address of a particular VIP. In some implementations, an initial server pool may be automatically created upon creation of the VIP. For subsequent server pools, resource management device 104-3 may receive a user request to add a pool to the VIP (e.g., via user selection of add port option 666 in create VIP dialog 664).

The new server IP address may be added to the pool (block 860). For example, resource management device 104-3 may receive a request (e.g., via user portal device 102-2) to add the new server IP to a particular server pool. The request may indicate the new IP address and port associated with the member server/pool and a service state that the server should be placed in (e.g., in service or out of service). In some implementations, information relating to available IP addresses (including primary and additional server IP addresses) may be extracted from resource manager database 104-2 upon receipt of the request.

It may be determined whether the server to be added has been previously added to load balancer 108-4 (block 865). If so (block 865—NO), receipt of the server add request may cause queuing of add server IP function 705-7, and add server to pool function 705-9 in job database device 104-1 for execution by workflow engine 106-1 (block 870).

However, if the added server has been previously added to load balancer 108-4 (block 865—YES), receipt of the member server add request may cause queuing of the add server pool function 705-9 in job database device 104-1 for execution by workflow engine 106-1 (block 875). In some implementations, a particular VIP design (e.g., added servers, configured server pools, etc.) may be stored in resource management device 104-3 for later submission. In this case, queuing of functions 505-3, 505-7, and 505-9 may be performed upon submission of the saved design.

Workflow engine device 106-1, which polls/checks job database device 104-1, may detect the job descriptions at job database device 104-1 and perform jobs that are associated with the job descriptions (block 880). Load balancer 108-4 may then be provisioned based on the executed jobs (block 885). In performing the provisioning, workflow engine device 106-1 may request network management device 106-3 to provision load balancer 108-4.

The above paragraphs describe how a system may enable a user to assign multiple Internet protocol (IP) addresses to a server device in a computing as a service environment. In one implementation, the user may connect to an integrated provisioning system via a web portal. Once connected via a web interface, the user may configure a provisioned server to include multiple IP addresses, this appearing as multiple server devices. Once the multiple IP addresses have been assigned, server pools or load balancing resource pools may be configured based on the IP addresses.

The foregoing description of exemplary implementations provides illustration and description, but is not intended to be exhaustive or to limit the embodiments described herein to the precise form disclosed. Modifications and variations are possible in light of the above teachings or may be acquired from practice of the embodiments.

Further, while series of acts have been described with respect to FIG. 8, the order of the acts may be varied in other implementations. Moreover, non-dependent acts may be implemented in parallel.

It will also be apparent that various features described above may be implemented in many different forms of software, firmware, and hardware in the implementations illustrated in the figures. The actual software code or specialized control hardware used to implement the various features is not limiting. Thus, the operation and behavior of the features of the invention were described without reference to the specific software code—it being understood that one would be able to design software and control hardware to implement the various features based on the description herein.

Further, certain features described above may be implemented as "logic" that performs one or more functions. This logic may include hardware, such as one or more processors, microprocessors, application specific integrated circuits, or field programmable gate arrays, software, or a combination of hardware and software.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:

1. A method comprising:
   providing a graphical user interface to a user via a web portal;
   displaying a representation of a provisioned server device via the graphical user interface,
   wherein a primary Internet protocol (IP) address is assigned to the provisioned server device for receiving traffic for the provisioned server device;
   receiving a selection of the provisioned server device;
   receiving a request to assign a secondary IP address to the selected provisioned server device for receiving additional traffic for the provisioned server device, wherein the secondary IP address is different from the primary IP address;
   requesting an available IP address from a pool of IP addresses, wherein the available IP address is not assigned to another device;
   assigning, based on the request, the available IP address to the selected provisioned server device as the secondary IP address for receiving the additional traffic for the selected provisioned server; and
   receiving a request to configure a computing resource based on at least the secondary IP address, wherein the computing resource comprises a load balancer for distributing server load among one or more server resources, and wherein receiving the request to configure the computing resource comprises:
      receiving a request to add a server device associated with the secondary IP address as a member of a load balancing resource pool on the load balancer,
      queuing one or more jobs in a jobs database relating to adding the server device associated with the secondary IP address as a member of the load balancing resource pool;
      dequeing the one or more jobs from the jobs database by a workflow engine; and
      executing the dequeued one or more jobs relating to adding the server device associated with the secondary IP address by the workflow engine.

2. The method of claim 1, wherein the request to assign the secondary IP address is received by a resource management device associated with the web portal.

3. The method of claim 1, wherein assigning the available IP address to the selected provisioned server device as the secondary IP address comprises updating one or more databases associated with the provisioned server device to include the secondary IP address.

4. The method of claim 1, wherein the provisioned server device comprises a physical server device or a virtual server device.

5. The method of claim 1, wherein the request to add the server device associated with the secondary IP address includes at least the secondary IP address, a hostname associated with the server device, and an IP address associated with the load balancing resource pool; and
   wherein receiving the request to configure the computing resource comprises storing information relating to the request to add a server device associated with the secondary IP address as a server design.

6. The method of claim 5, further comprising:
   receiving a request to queue one or more jobs in a jobs database relating to the server design;
   dequeing the one or more jobs from the jobs database by a workflow engine; and
   executing, by the workflow engine, the dequeued jobs relating to the server design to add the server device associated with the secondary IP address as a member of a load balancing resource pool on the load balancer.

7. A system that includes one or more processors, wherein the one or more processors comprise:
   web portal logic to:
      provide a user interface portal for providing information regarding provisioned services,
      wherein the provisioned services include at least one provisioned server device having a primary Internet protocol (IP) address assigned thereto for receiving traffic for the provisioned server device; and
      wherein the user interface portal receives a request to assign a secondary IP address to the provisioned server device in addition to the primary IP address; and
   resource management logic to:
      receive the request to assign the secondary IP address to the provisioned server device via the web portal logic;
      request an available IP address from a pool of IP addresses, wherein the available IP address is not assigned to another device;
      assign the available IP addresses to the provisioned server device as the secondary IP address for receiving additional traffic for the provisioned server device based on the request; and
      receive a request to configure a computing resource based on at least the secondary IP address,
      wherein the computing resource comprises a load balancer for distributing server load across one or more server resources, and
      wherein, when receiving the request to configure the computing resource, the resource management logic is further configured to:
         receive a request to add a server device associated with the secondary IP address as a member of a load balancing resource pool on the load balancer,
         queue one or more jobs in a jobs database relating to adding the server device associated with the secondary IP address as a member of the load balancing resource pool;
         dequeue the one or more jobs from the jobs database by a workflow engine; and
         execute the dequeued one or more jobs relating to adding the server device associated with the secondary IP address by the workflow engine.

8. The system of claim 7, wherein the provisioned server device comprises a virtual server device or a physical server device.

9. The system of claim 7, wherein the resource management logic to assign the secondary IP address to the provisioned server device is further configured to:
   update one or more databases associated with the provisioned server device to include the secondary IP address.

10. The system of claim 7, wherein the web portal logic is further configured to receive a request to configure a computing resource based on at least the secondary IP address.

11. The system of claim 10, wherein the computing resource comprises a load balancer for distributing server load across one or more server resources.

12. The system of claim 11, wherein the resource management logic is further configured to:
- generate one or more jobs for configuring the load balancer based on the request received by the web portal logic;
- place the one or more jobs for configuring the load balancer in a database; and
- wherein the system further comprises:
  - workflow engine logic to drive an execution of the one or more jobs in the database, the one or more jobs comprising instructions for one or more of devices in the system to configure the load balancer to include at least one load balancing resource pool having at least one server member associated with the secondary IP address.

13. Non-transitory computer-readable media comprising computer executable instructions for causing one or more processors to:
- provide a graphical user interface to a user via a web portal;
- display a representation of a provisioned server device via the graphical user interface,
- wherein a primary Internet protocol (IP) address is assigned to the provisioned server device for receiving traffic for the provisioned server device;
- receive a selection of the provisioned server device;
- receive a request to assign a secondary IP address to the provisioned server device, wherein the secondary IP address is different from the primary IP address;
- request an available IP address from a pool of IP addresses, wherein the available IP address is not assigned to any other device;
- assign the available IP address, as the secondary IP address for receiving additional traffic for the provisioned server device, to provisioned server device based on the request;
- receive a request to add the provisioned server device having the secondary IP address to a load balancer resource pool on a load balancer for distributing server load across one or more server resources;
- queue one or more jobs in a jobs database relating to adding the server device associated with the secondary IP address to the load balancer resource pool;
- dequeue the one or more jobs from the jobs database by a workflow engine; and
- execute the dequeued one or more jobs relating to adding the provisioned server device associated with the secondary IP address by the workflow engine.

14. The non-transitory computer-readable media of claim 13, wherein the request to assign a secondary IP address is received by a resource management device associated with the web portal.

15. The non-transitory computer-readable media of claim 13, wherein the instructions that cause the one or more processors to assign the secondary IP address to the provisioned server device further comprise instructions that cause the one or more processors to update one or more databases associated with the provisioned server device to include the secondary IP address.

16. The non-transitory computer-readable media of claim 13, wherein the provisioned server device comprises a virtual server device or a physical server device.

* * * * *